(12) United States Patent
Yamamoto

(10) Patent No.: US 10,447,387 B2
(45) Date of Patent: Oct. 15, 2019

(54) OPTICAL TRANSMISSION/ RECEPTION DEVICE, OPTICAL COMMUNICATION SYSTEM AND OPTICAL TRANSMISSION/ RECEPTION METHOD

(71) Applicant: NEC Corporation, Tokyo (JP)

(72) Inventor: Hiroshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/392,511

(22) Filed: Dec. 28, 2016

(65) Prior Publication Data

US 2017/0111109 A1   Apr. 20, 2017

Related U.S. Application Data

(63) Continuation of application No. 14/776,003, filed as application No. PCT/JP2014/001352 on Mar. 11, 2014.

(30) Foreign Application Priority Data

Mar. 15, 2013 (JP) ................................ 2013-053440

(51) Int. Cl.
*H04B 10/00* (2013.01)
*H04B 10/03* (2013.01)
(Continued)

(52) U.S. Cl.
CPC ............ *H04B 10/03* (2013.01); *H04B 10/40* (2013.01); *H04B 10/564* (2013.01);
(Continued)

(58) Field of Classification Search
USPC ....................................................... 398/135
See application file for complete search history.

(56) References Cited

U.S. PATENT DOCUMENTS 4,460,249 A * 7/1984 Vincent ................. G02F 1/0123
359/276
5,780,843 A * 7/1998 Cliche ....................... G01J 3/10
250/205
(Continued)

FOREIGN PATENT DOCUMENTS

CN     101241186 A     8/2008
CN     101414891 A     4/2009
(Continued)

OTHER PUBLICATIONS

Decision to Grant Patent dated Feb. 14, 2017, by the Japanese Patent Office in counterpart Japanese Patent Application No. 2015-505289.
(Continued)

*Primary Examiner* — Agustin Bello
(74) *Attorney, Agent, or Firm* — Finnegan, Henderson, Farabow, Garrett & Dunner, L.L.P.

(57) ABSTRACT

Even in a case where light sources at an optical transmission-side and an optical reception-side are made into a common light source, a optical transmission function and an optical reception function are enabled to be used at a time. An optical transmission/reception device according to the present invention includes optical split means for splitting the light from the optical output means into a first split light and a second split light, optical power adjustment means for respectively adjusting the optical power of the first split light and the optical power of the second split light, optical transmission means for modulating the first split light whose optical power is adjusted, and outputting the modulated first split light as a first optical signal, optical reception means for receiving the second split light whose optical power is adjusted and a second optical signal given from an outside by causing the second split light and the second optical signal to be interfered with each other, and control means for
(Continued)

controlling the optical power adjustment means in accordance with an optical property of the output light.

21 Claims, 12 Drawing Sheets

(51) Int. Cl.
    *H04B 10/564*     (2013.01)
    *H04B 10/61*     (2013.01)
    *H04B 10/572*     (2013.01)
    *H04B 10/40*     (2013.01)

(52) U.S. Cl.
    CPC ............ *H04B 10/572* (2013.01); *H04B 10/61* (2013.01); *H04B 10/616* (2013.01)

(56) References Cited

U.S. PATENT DOCUMENTS

| | | | | |
|---|---|---|---|---|
| 5,801,860 | A * | 9/1998 | Yoneyama | H04J 14/0221 14/221 |
| 5,917,637 | A * | 6/1999 | Ishikawa | G02F 1/0123 398/197 |
| 5,923,453 | A | 7/1999 | Yoneyama | |
| 5,966,229 | A * | 10/1999 | Dodley | H04B 10/1121 398/106 |
| 6,046,838 | A * | 4/2000 | Kou | G02F 1/0516 359/239 |
| 6,111,681 | A * | 8/2000 | Mizrahi | G02B 6/02204 372/32 |
| 6,134,253 | A * | 10/2000 | Munks | G02B 5/20 372/23 |
| 6,163,555 | A * | 12/2000 | Siddiqui | H01S 5/0687 372/102 |
| 6,539,038 | B1 * | 3/2003 | Wilkerson, Jr. | G02F 1/0123 372/25 |
| 6,553,042 | B2 * | 4/2003 | Shio | H01S 3/13 372/23 |
| 6,583,910 | B1 * | 6/2003 | Satoh | H04B 10/07955 359/239 |
| 6,590,686 | B1 * | 7/2003 | Sekiya | H04B 10/503 398/182 |
| 6,652,158 | B2 * | 11/2003 | Bartur | G02B 6/4202 385/88 |
| 6,735,395 | B1 * | 5/2004 | Bai | H04B 10/504 372/31 |
| 6,738,584 | B1 * | 5/2004 | Tsuda | H04B 10/11 385/123 |
| 6,757,499 | B1 * | 6/2004 | Aoki | H04B 10/504 372/32 |
| 6,807,203 | B2 * | 10/2004 | Adams | G01J 9/00 372/28 |
| 6,839,518 | B1 * | 1/2005 | Minamimoto | H04B 10/077 398/160 |
| 6,842,587 | B1 * | 1/2005 | McGhan | H04B 10/503 398/183 |
| 7,006,769 | B1 * | 2/2006 | Kawasaki | G02F 1/0121 398/147 |
| 7,092,638 | B2 * | 8/2006 | Funami | H04J 14/0221 398/140 |
| 7,133,610 | B1 * | 11/2006 | Shimura | H04B 10/50575 398/15 |
| 7,139,491 | B2 * | 11/2006 | Katagiri | H04B 10/85 398/195 |
| 7,376,348 | B2 * | 5/2008 | Hasuo | H04B 10/032 398/15 |
| 7,379,672 | B2 * | 5/2008 | Wang | H04B 10/25751 356/451 |
| 7,522,846 | B1 * | 4/2009 | Lewis | H04B 10/07955 398/195 |
| 7,593,547 | B2 | 9/2009 | Lee et al. | |
| 7,593,647 | B2 * | 9/2009 | Lee | H04B 10/572 398/182 |
| 7,634,201 | B2 * | 12/2009 | Maleki | G02B 6/29341 356/484 |
| 7,720,392 | B2 * | 5/2010 | Nakashima | G02F 1/2255 398/158 |
| 7,801,450 | B2 * | 9/2010 | Abe | H04B 10/07957 398/193 |
| 7,936,999 | B1 * | 5/2011 | Hawryluck | H04B 10/60 398/152 |
| 7,962,044 | B2 * | 6/2011 | McCallion | G02B 6/4201 356/454 |
| 8,190,033 | B2 * | 5/2012 | Tu | H04B 10/572 398/196 |
| 8,218,974 | B2 * | 7/2012 | Hattori | H04B 10/85 398/159 |
| 8,340,525 | B2 * | 12/2012 | Bai | H04B 10/572 372/32 |
| 8,548,333 | B2 * | 10/2013 | Nagarajan | H04B 10/40 398/138 |
| 8,565,616 | B2 * | 10/2013 | Tanaka | H04B 10/50575 398/152 |
| 8,588,622 | B2 * | 11/2013 | Yasuda | H04B 10/564 398/197 |
| 8,660,437 | B1 * | 2/2014 | Blauvelt | H04B 10/07957 398/136 |
| 8,787,768 | B2 * | 7/2014 | Klotz | H04B 10/676 398/158 |
| 8,855,484 | B2 * | 10/2014 | Tsai | H04B 10/40 398/135 |
| 8,971,362 | B2 * | 3/2015 | Smith | H01S 5/0683 372/29.021 |
| 9,014,566 | B2 * | 4/2015 | Gottwald | H04B 10/40 398/135 |
| 9,143,236 | B1 * | 9/2015 | Bartur | G01M 11/3145 |
| 9,203,518 | B2 * | 12/2015 | Ishii | H04B 10/564 |
| 9,735,888 | B2 * | 8/2017 | Fludger | H04B 10/6164 |
| 2001/0009469 | A1 | 7/2001 | Shimizu | G01J 11/00 398/197 |
| 2002/0171889 | A1 * | 11/2002 | Takeuchi | H04B 10/077 398/34 |
| 2004/0131366 | A1 * | 7/2004 | Tsushima | H04B 10/506 398/197 |
| 2005/0008369 | A1 | 1/2005 | Winzer | |
| 2005/0201759 | A1 * | 9/2005 | Wang | H04B 10/25751 398/183 |
| 2005/0201761 | A1 * | 9/2005 | Bartur | H04B 10/071 398/197 |
| 2008/0107428 | A1 * | 5/2008 | Abe | H04B 10/07957 398/187 |
| 2009/0003843 | A1 * | 1/2009 | Oomori | H01S 5/0622 398/197 |
| 2009/0268901 | A1 * | 10/2009 | Lodewyck | H04L 9/0852 380/41 |
| 2010/0232805 | A1 * | 9/2010 | Cai | H04B 10/61 398/158 |
| 2011/0243556 | A1 * | 10/2011 | Nagarajan | H04B 10/40 398/43 |
| 2011/0299849 | A1 * | 12/2011 | Klotz | H04B 10/073 398/26 |
| 2012/0093502 | A1 * | 4/2012 | Gottwald | H04B 10/27 398/27 |
| 2012/0170092 | A1 * | 7/2012 | Rohde | H04B 10/60 359/196.1 |
| 2012/0230672 | A1 * | 9/2012 | Gottwald | H04B 10/272 398/7 |
| 2013/0058653 | A1 * | 3/2013 | Gottwald | H04B 10/272 398/58 |
| 2013/0208335 | A1 * | 8/2013 | Gottwald | G02F 1/01 359/279 |
| 2015/0188639 | A1 * | 7/2015 | Akashi | H04B 10/50575 398/197 |
| 2016/0036430 | A1 | 2/2016 | Yamamoto | |
| 2016/0036530 | A1 * | 2/2016 | Yamamoto | H04B 10/564 398/1 |

(56) References Cited

U.S. PATENT DOCUMENTS

| | | | | |
|---|---|---|---|---|
| 2016/0146869 A1* | 5/2016 | Marsland, Jr. | ..... | H04B 10/0731 324/76.77 |
| 2017/0111109 A1* | 4/2017 | Yamamoto | ........... | H04B 10/564 |
| 2017/0117969 A1* | 4/2017 | Fludger | .............. | H04B 10/6164 |

FOREIGN PATENT DOCUMENTS

| | | |
|---|---|---|
| CN | 201680924 U | 12/2010 |
| CN | 102142902 A | 8/2011 |
| CN | 102802093 A | 11/2012 |
| CN | 102868443 A | 1/2013 |
| CN | 102870352 A | 1/2013 |
| CN | 102946282 A | 2/2013 |
| JP | 63-59125 | 3/1988 |
| JP | 2002-59833 | 2/2002 |
| JP | 2004-312550 | 11/2004 |
| JP | 2005-45789 | 2/2005 |
| JP | 4237527 | 3/2009 |
| JP | 2010-54925 | 3/2010 |
| JP | 2010-245772 | 10/2010 |
| JP | 2011-160146 | 8/2011 |
| JP | 2013-46162 | 3/2013 |
| WO | WO 2012/113447 | 8/2012 |
| WO | WO 2014-141685 | 9/2014 |

OTHER PUBLICATIONS

Japanese Office Action dated Aug. 30, 2016, by the Japanese Patent Office in counterpart Japanese Patent Application No. 2015-505289.
Chinese Office Action dated Oct. 25, 2016, by the Chinese Patent Office in counterpart Chinese Patent Application No. 201480016080. 8.
International Search Report and Written Opinion dated May 13, 2014 in corresponding PCT International Application.
Notification of Reasons for Refusal in counterpart Japanese Patent Application No. 2017-050123, dated Jan. 30, 2018.

* cited by examiner

Fig. 5

| WAVELENGTH VARIABLE LIGHT | OPTICAL OUTPUT POWER | ATTENUATION QUANTITY 1 | ATTENUATION QUANTITY 2 |
|---|---|---|---|
| $\lambda 1$ | A11 | B11 | C11 |
| | A12 | B12 | C12 |
| | A13 | B13 | C13 |
| | ... | ... | ... |
| $\lambda 2$ | A21 | B21 | C21 |
| | A22 | B22 | C22 |
| | A23 | B23 | C23 |
| | ... | ... | ... |
| ... | | | ... |

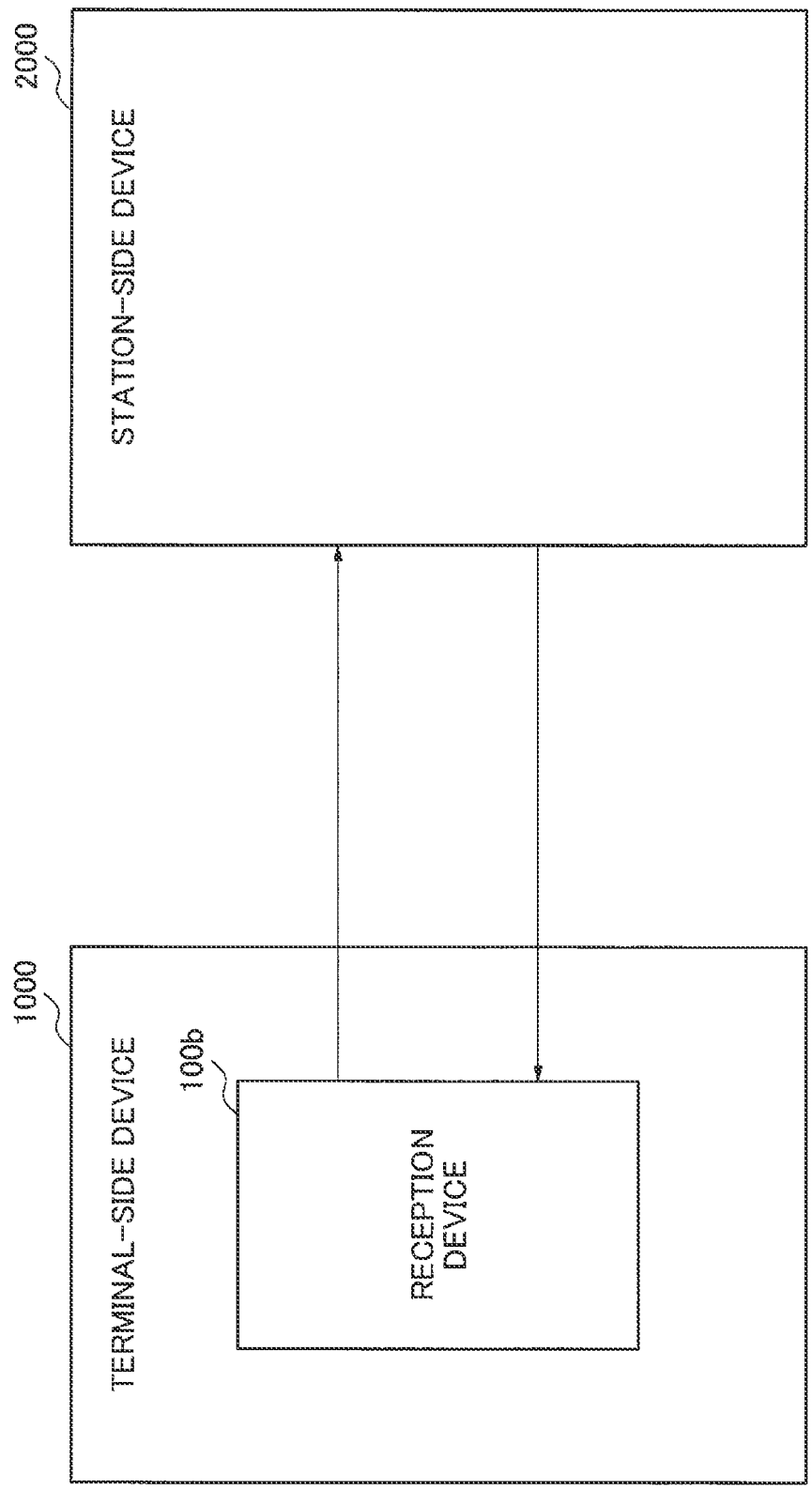

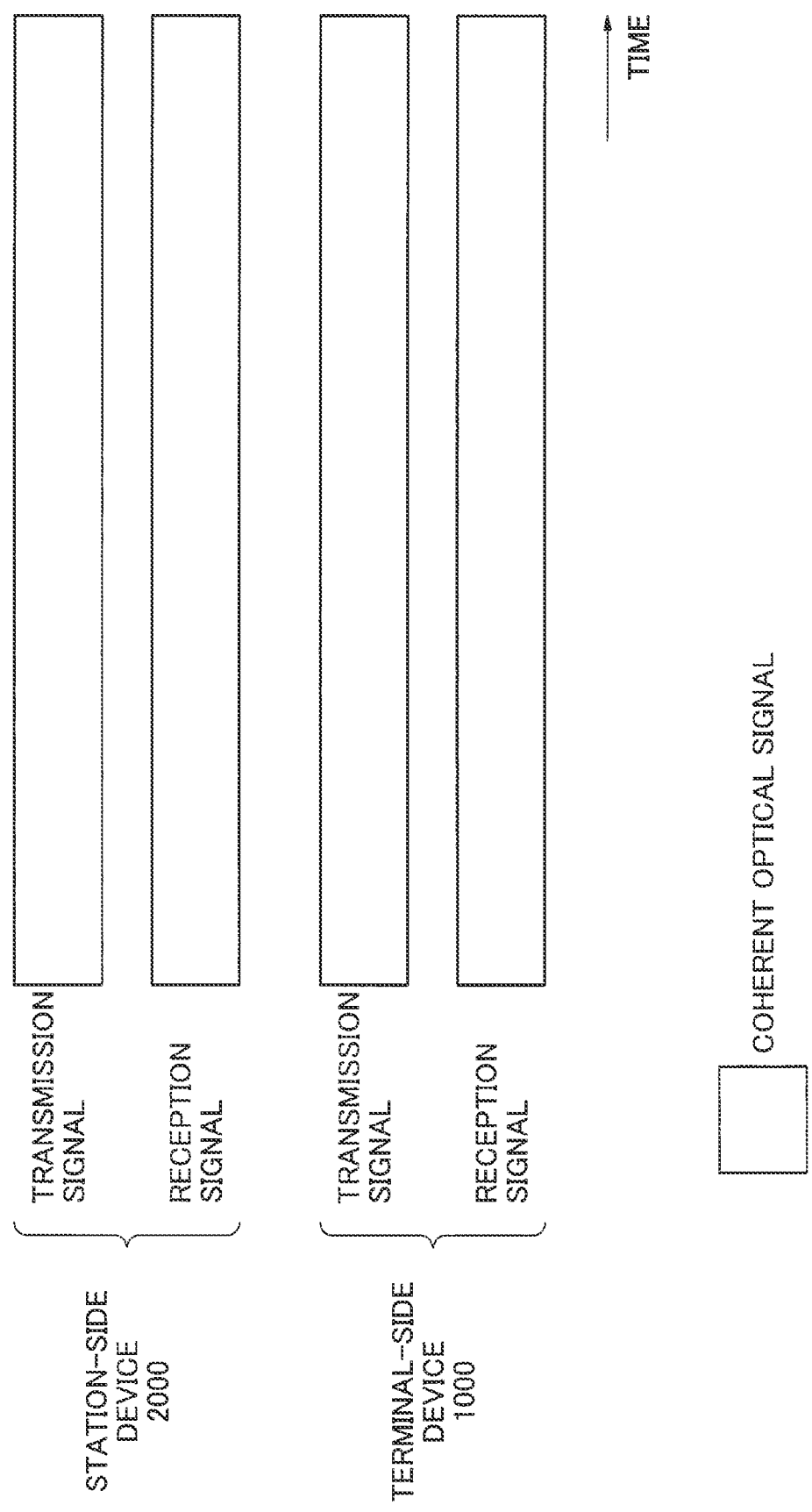

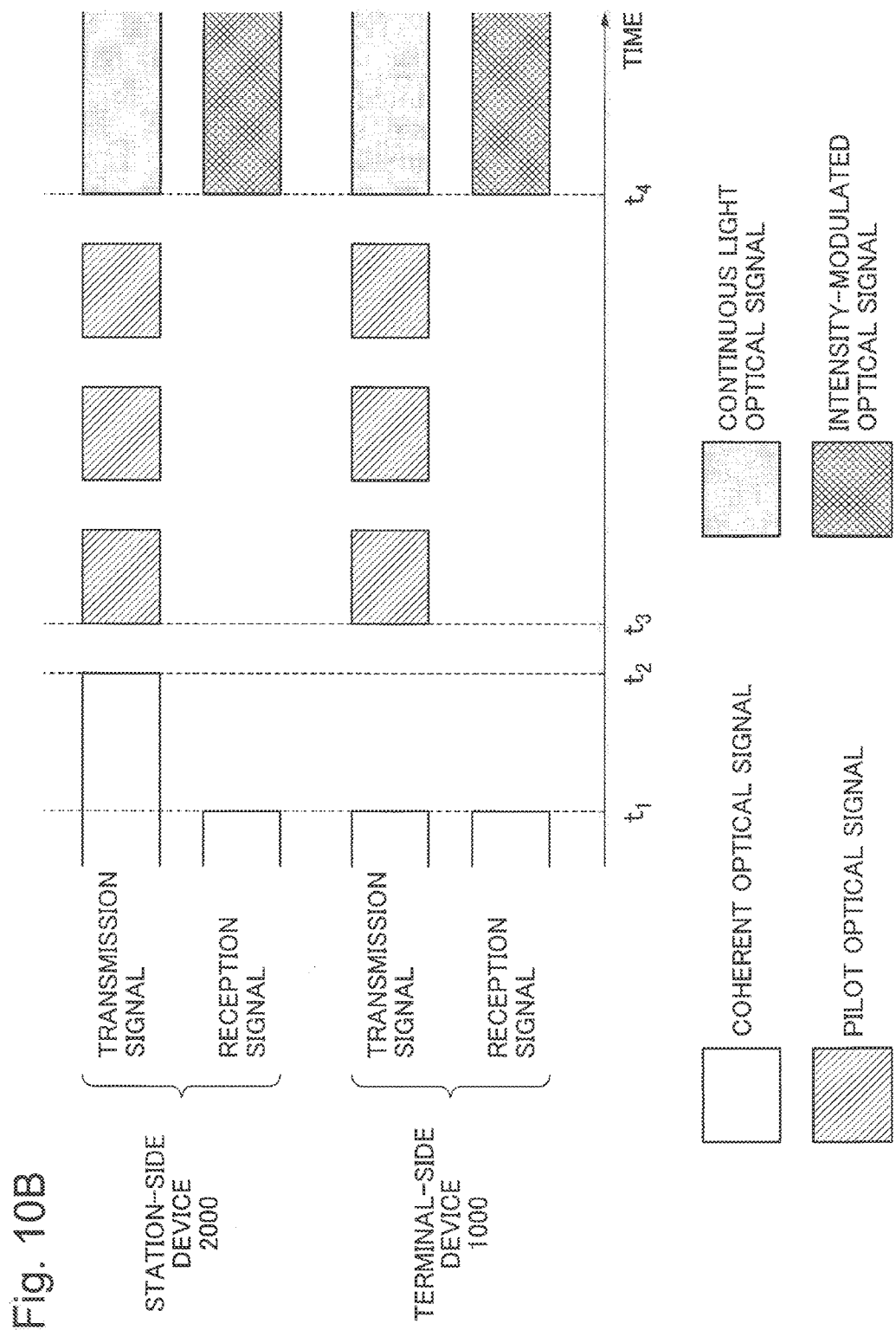

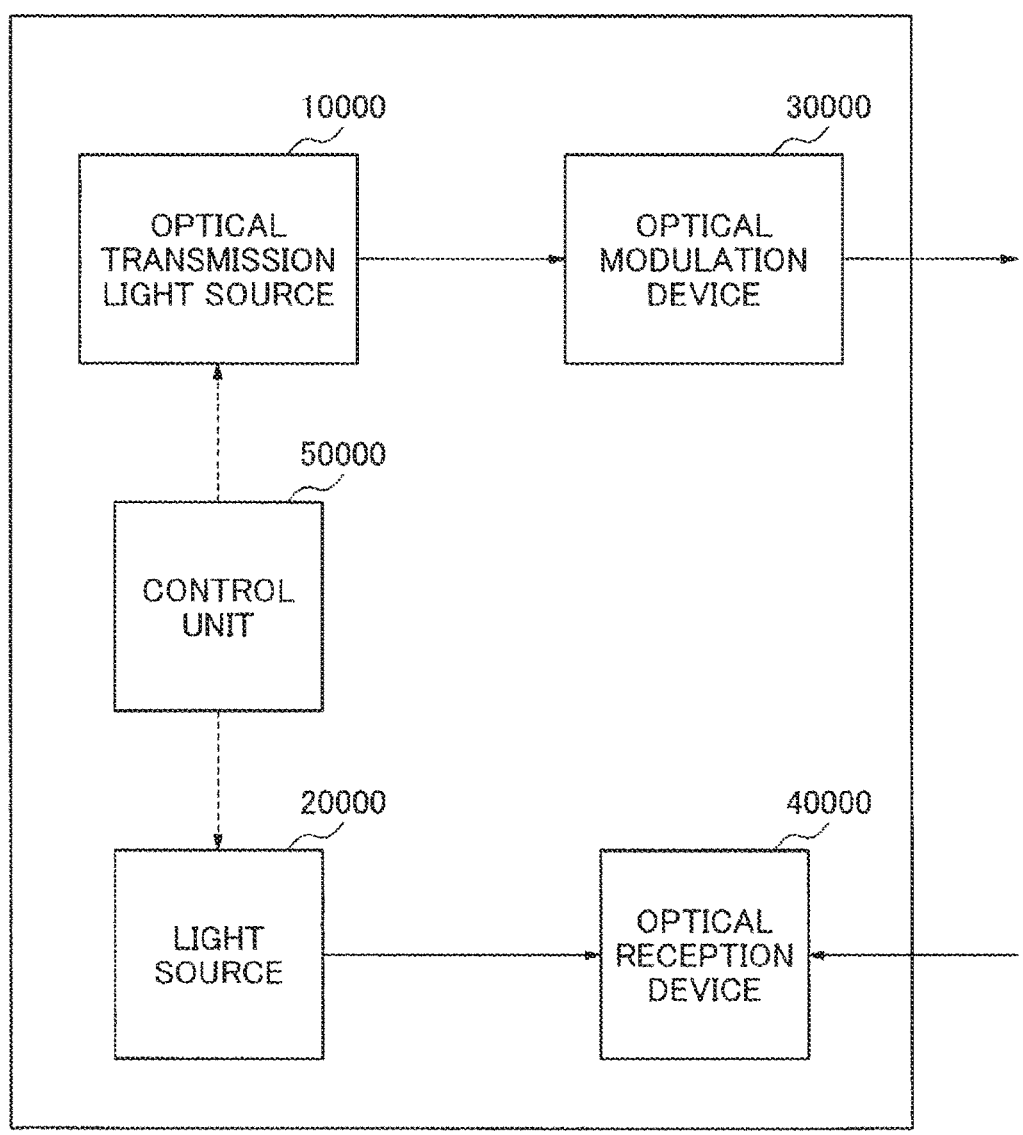

OPTICAL TRANSMISSION/ RECEPTION DEVICE, OPTICAL COMMUNICATION SYSTEM AND OPTICAL TRANSMISSION/ RECEPTION METHOD

CROSS-REFERENCE TO RELATED PATENT APPLICATIONS

This application is a continuation of U.S. application Ser. No. 14/776,003, filed on Sep. 14, 2015, which is a National Stage Entry of International Application No. PCT/JP2014/001352, filed Mar. 11, 2014, which claims priority from Japanese Patent Application No. 2013-053440, filed Mar. 15, 2013. The contents of the above-referenced applications are expressly incorporated herein by reference each of these applications are incorporated herein by reference.

TECHNICAL FIELD

The present invention relates to an optical transmission/reception device and an optical transmission/reception method used for an optical communication system and an optical communication system, and more particularly relates to an optical transmission/reception device and an optical transmission/reception method using a digital coherent technique, and an optical communication system.

BACKGROUND ART

In recent years, a digital coherent optical transmission technique has been put into practice, and a high-reliable long-distance large-capacity transmission accommodating various ultra high-speed client signals in an ultra high-speed single wavelength channel having a speed equal to or more than 100 Gbit/s has been realized.

A block configuration diagram of a generally-available digital coherent optical transmission/reception device is shown in FIG. 11. The generally-available digital coherent optical transmission/reception device is implemented with an optical transmission light source 10000 and an optical reception light source 20000. A control unit 50000 respectively adjusts the optical output powers of the optical transmission light source 10000 and the optical reception light source 20000, thus optimizing the transmission and reception property.

The light which is output from the optical transmission function light source 10000 is optically modulated by the optical modulation device 30000, and is output as an output signal light. The light which is output from the optical reception light source 20000 interferes with an optical signal which is input into the optical reception device 40000 as a local oscillation (LO: Local Oscillator) light.

In this case, the wavelength of the light which is output from the optical reception light source 20000 interferes with the optical signal which is input into the optical reception device 40000, and therefore, the wavelength needs to be the same as the wavelength of the input optical signal. The digital coherent optical transmission/reception device uses a wavelength variable light source as the light source at the reception side, thereby changing the wavelength of the LO light in accordance with the wavelength of the input optical signal. Therefore, in a case where a wavelength division multiplexing (WDM: Wavelength Division Multiplexing) optical signal is input, a particular wavelength can be selectively received from the WDM signal.

On the other hand, in the digital coherent optical transmission/reception device, the demand for reducing electric power consumption and reducing the size is increasing. As a technique for reducing electric power consumption and reducing the size of the digital coherent optical transmission/reception device, for example, a technique has been suggested to make the optical transmission function light source and the optical reception function light source into a common light source, and reduce the light source implemented on the digital coherent optical transmission/reception device.

PTL 1 discloses an optical communication transmission/reception device in which an optical switch switches an output light from a light source into an optical transmission circuit or an optical reception circuit, and in which an optical split circuit splits the output light from the light source into an optical transmission circuit and an optical reception circuit, although this is not a digital coherent optical transmission/reception device.

CITATION LIST

Patent Literature

[Patent Literature 1] Japanese Patent Laid-Open No. S 63-059125

SUMMARY OF INVENTION

Technical Problem

However, an optical transmission/reception device of PTL 1 cannot be applied to a digital coherent optical transmission/reception device as it is. The reason for this is that, in a case where an output light is switched by using an optical switch, light cannot be input from a light source to an optical transmission circuit and an optical reception circuit at a time. In a case where an optical split circuit is used, light can be input into the optical transmission circuit and the optical reception circuit at a time, but when the optical power of the light source is adjusted at one side, the optical power at the other side is also changed. In general, in the digital coherent optical transmission/reception device, the appropriate optical power is different between the transmission side and the reception side, and therefore, it is difficult to adjust the transmission side and the reception side into appropriate optical powers.

In particular, in a case where a wavelength variable light source is used for a light source, the appropriate powers at the transmission side and the reception side are different according to the wavelength, and the optimum power ratio is also different. Therefore, it is extremely difficult to adjust the transmission side and the reception side at each wavelength into appropriate optical powers at a time.

An object of the present invention is made in view of the above problems, and it is an object of the present invention to provide an optical transmission/reception device, an optical communication system, and an optical transmission/reception method capable of simultaneously using an optical transmission function and an optical reception function even in a case where the light source at the optical transmission side and the optical reception side into a common light source.

Solution to Problem

In order to achieve the above object, an optical transmission/reception device according to the present invention includes optical split means for splitting the light from the optical output means into a first split light and a second split light, optical power adjustment means for respectively adjusting the optical power of the first split light and the optical power of the second split light, optical transmission means for modulating the first split light whose optical power is adjusted, and outputting the modulated first split light as a first optical signal, optical reception means for receiving the second split light whose optical power is adjusted and a second optical signal given from an outside by causing the second split light and the second optical signal to be interfered with each other, and control means for controlling the optical power adjustment means in accordance with an optical property of the light that is output from the optical output means.

In order to achieve the above object, an optical communication system according to the present invention includes a terminal-side device including the optical transmission/reception device described above, and a station-side device capable of transmitting and receiving a coherent optical signal to and from the terminal-side device.

In order to achieve the above object, an optical transmission/reception method according to the present invention includes outputting light, splitting the output light into a first split light and a second split light, respectively adjusting the optical power of the first split light and the optical power of the second split light in accordance with the optical property of the output light, modulating the first split light obtained by adjusting the optical power, and outputting the modulated first split light as a first optical signal, and receiving the second split light obtained by adjusting the optical power and a second optical signal given from an outside by causing the second split light and the second optical signal to be interfered with each other.

Advantageous Effects of Invention

According to the present invention, even in a case where the light sources at the optical transmission side and the optical reception side are into a common light source, an optical transmission/reception device, an optical communication system, and an optical transmission/reception method capable of simultaneously using an optical transmission function and an optical reception function can be provided.

BRIEF DESCRIPTION OF DRAWINGS

FIG. 5 is an example of a data table stored in a memory of a control unit 60 according to the second exemplary embodiment.

FIG. 9 is a system configuration diagram illustrating an optical communication system according to a fourth exemplary embodiment.

FIG. 10A is an example of an optical signal which a terminal-side device 1000 and a station-side device 2000 according to the fourth exemplary embodiment transmit and receive in a normal state.

FIG. 10B is an example of an optical signal which the terminal-side device 1000 and the station-side device 2000 according to the fourth exemplary embodiment transmit and receive during occurrence of an abnormality.

FIG. 11 is a block configuration diagram illustrating a generally-available digital coherent optical transmission/reception device.

DESCRIPTION OF EMBODIMENTS

First Exemplary Embodiment

Figure 1:
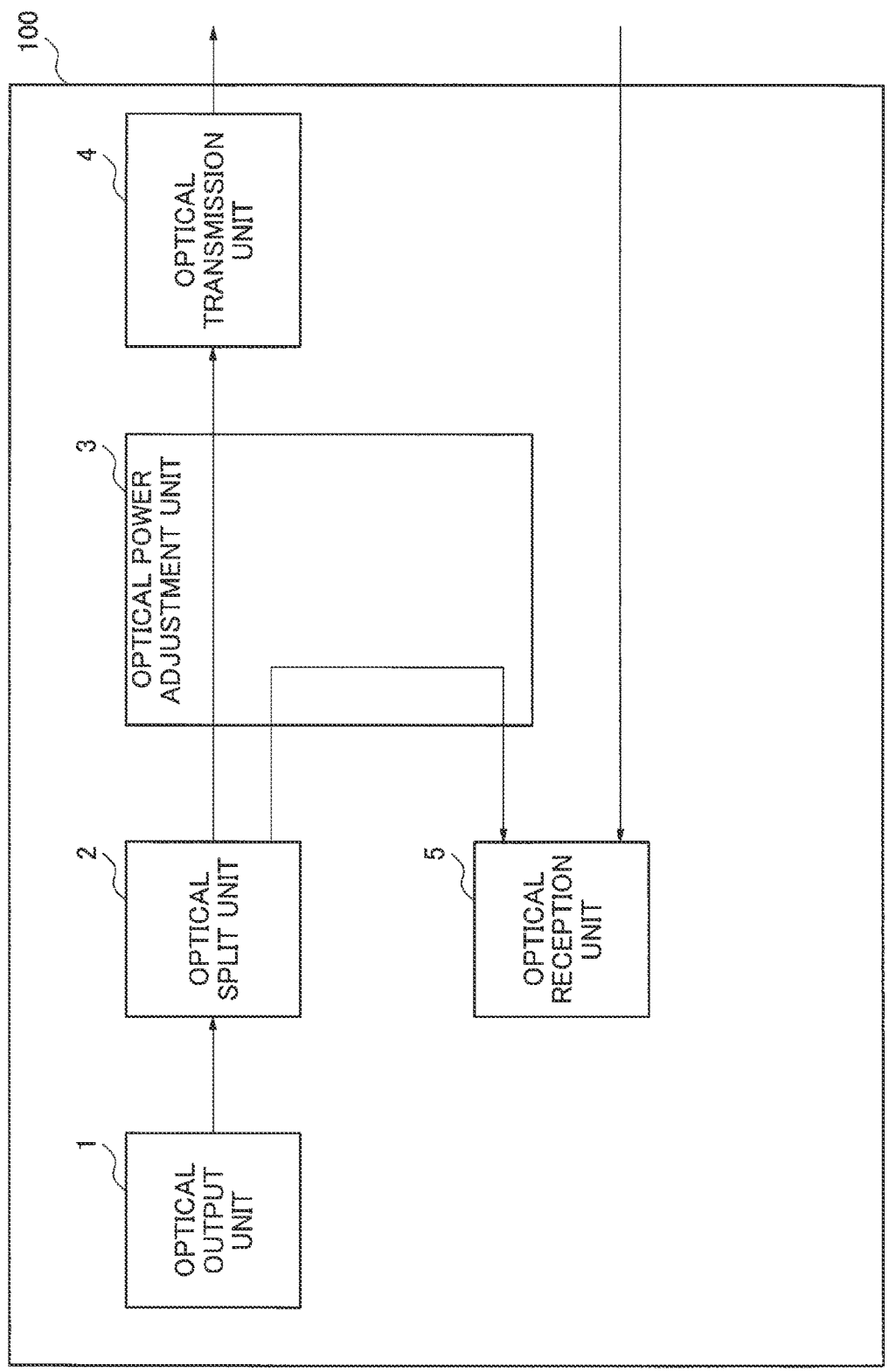
FIG. 1 is a block configuration diagram illustrating an optical transmission/reception device 100 according to a first exemplary embodiment.

An exemplary embodiment of the present invention will be explained in details with reference to drawings. FIG. 1 is a block configuration diagram illustrating an optical transmission/reception device 100 according to the first exemplary embodiment of the present invention. The optical transmission/reception device 100 according to the present exemplary embodiment includes an optical output unit 1, an optical split unit 2, an optical power adjustment unit 3, an optical transmission unit 4, and an optical reception unit 5.

Figure 2:
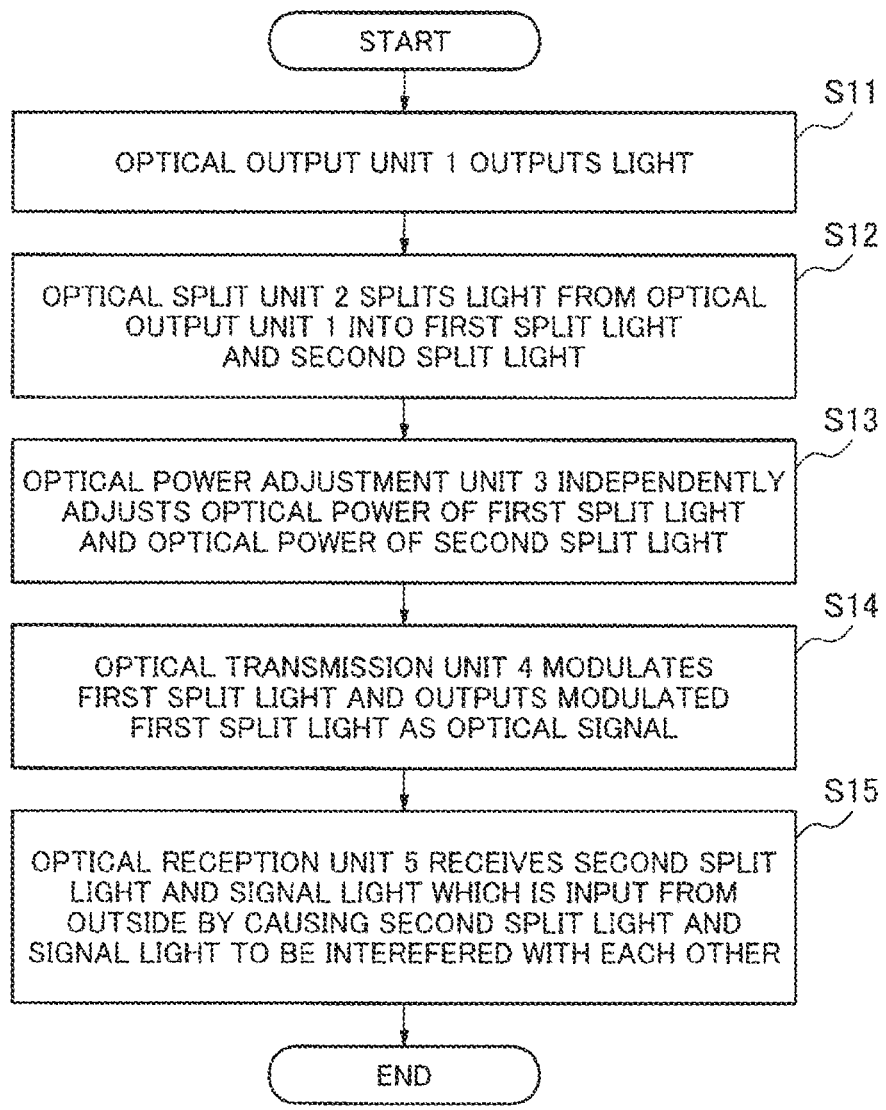
FIG. 2 is a flowchart illustrating operation of the optical transmission/reception device 100 according to the first exemplary embodiment.

Subsequently, operation of the optical transmission/reception device 100 according to the present exemplary embodiment will be explained. FIG. 2 is a flowchart illustrating operation of the optical transmission/reception device 100 according to the present exemplary embodiment. The optical output unit 1 outputs light (step S11). The optical split unit 2 splits the light, which is output from the optical output unit 1, into a first split light and a second split light (step S12). The optical power adjustment unit 3 independently adjusts the optical power of the first split light and the optical power of the second split light in accordance with the property of the light which is output from the optical output unit 1 (step S13). In step S13, the optical power of at least one of the first split light and the second split light is adjusted by the optical power adjustment unit 3.

The optical transmission unit 4 modulates the first split light to output the modulated light as an optical signal (step S14). The optical reception unit 5 receives the second split light and the signal light that is input from the outside of the optical reception device 100 by causing the second split light and the signal light to be interfered with each other (step S15).

According to the present exemplary embodiment, the light which is output from the optical output unit 1 is split by the optical split unit 2, and the optical power adjustment unit 3 independently adjusts the optical powers, and therefore, both of the optical transmission unit 4 and the optical reception unit 5 can use the light which is output from the optical output unit 1. Therefore, even when the light source of the optical transmission-side and the light source of the optical reception-side are made into a common light source, the optical reception device 100 according to the present exemplary embodiment can use the optical transmission function and the optical reception function at a time.

Second Exemplary Embodiment

Figure 3:
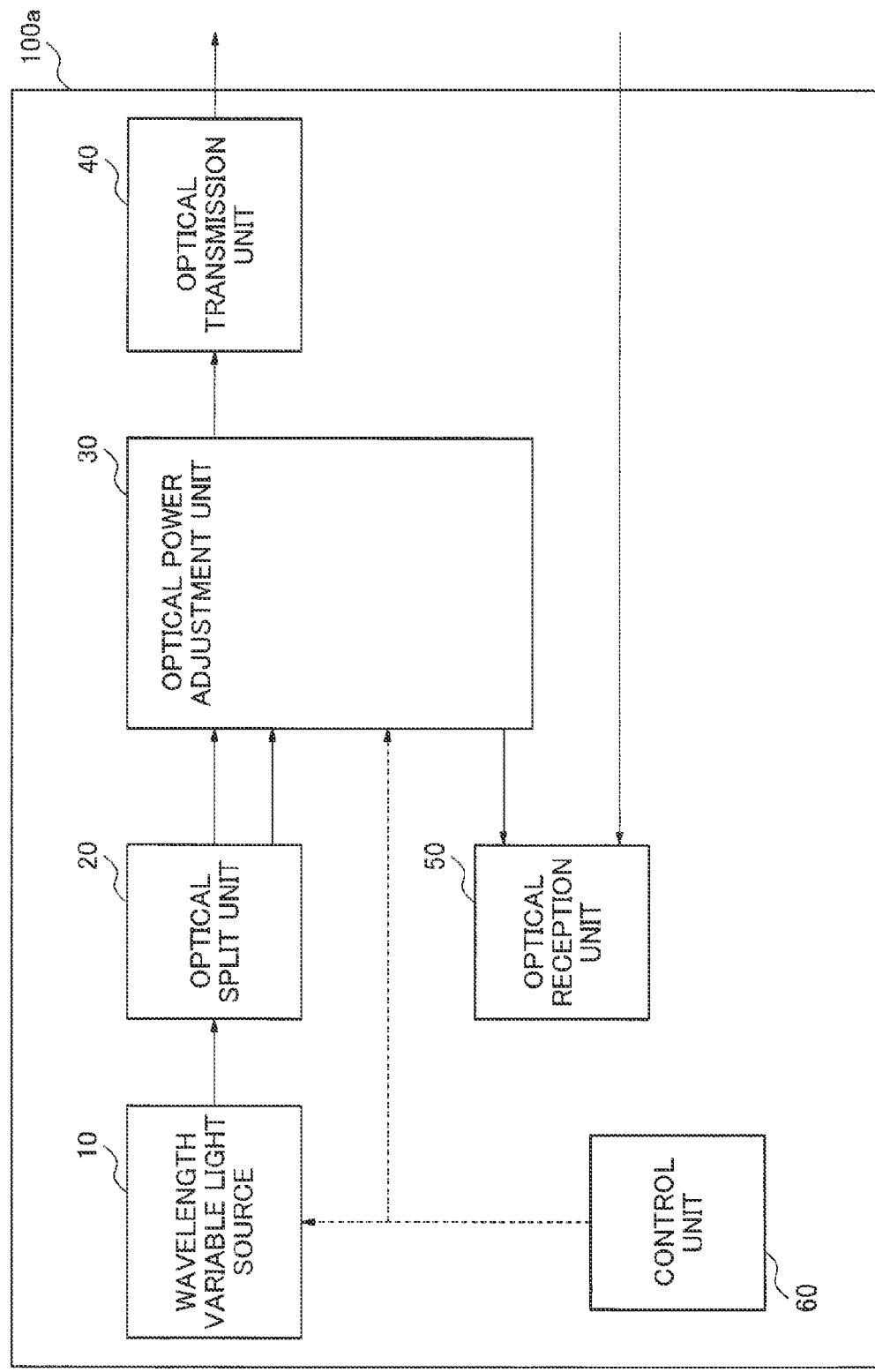
FIG. 3 is a block configuration diagram illustrating an optical transmission/reception device 100a according to a second exemplary embodiment.

Subsequently, the second exemplary embodiment according to the present invention will be explained. FIG. 3 is a block configuration diagram illustrating an optical transmission/reception device 100a according to the present exemplary embodiment. The optical transmission/reception device 100a includes a wavelength variable light source 10, an optical split unit 20, an optical power adjustment unit 30, an optical transmission unit 40, an optical reception unit 50, and a control unit 60. In FIG. 3, a solid line arrow indicates a path of light, and a broken line arrow indicates a control electric signal.

The wavelength variable light source 10 can change the wavelength, and outputs light of a predetermined wavelength within a WDM communication wavelength band. The optical split unit 20 is an optical element for splitting light such as an optical coupler.

Figure 4:
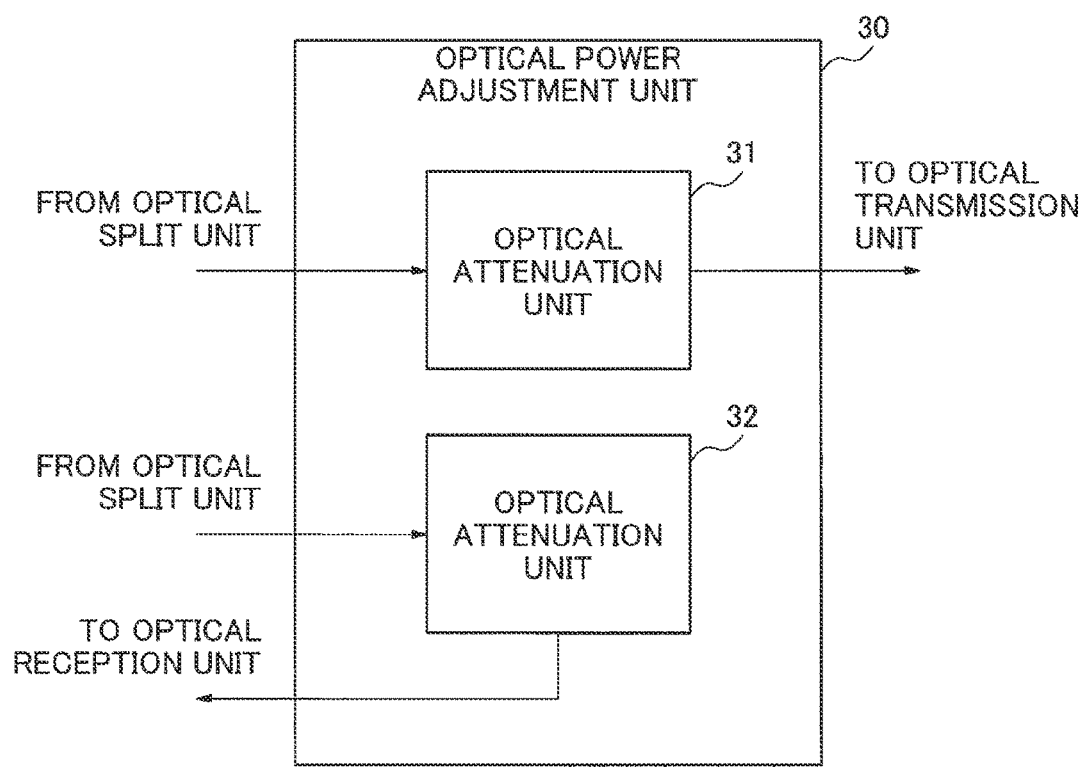
FIG. 4 is a block configuration diagram illustrating an optical power adjustment unit 30 according to the second exemplary embodiment.

The detailed block configuration diagram of the optical power adjustment unit 30 is shown in FIG. 4. The optical power adjustment unit 30 includes optical attenuation units 31, 32. An optical element such as a variable optical attenuator can be used as the optical attenuation units 31, 32.

The optical transmission unit 40 is an optical circuit having an optical modulation function such an LN (Lithium-Niobate) modulation device. The optical reception unit 50 is an optical circuit having a digital coherent detection function.

The control unit 60 controls the optical power adjustment unit 30 in accordance with the optical property of the light which is output from the wavelength variable light source 10. For example, the control unit 60 can be made of a computation element such as a microcomputer, and includes a memory storing a data table provided in the control unit 60 or outside of the control unit 60. The control unit 60 controls the optical output power and the wavelength of the wavelength variable light source 10 or the optical power adjustment quantity of the optical power adjustment unit 30 on the basis of the data table.

An example of a data table stored in the memory of the control unit 60 is shown in FIG. 5. The data table of FIG. 5 stores the optical output powers and the attenuation quantities of the optical attenuation units 31, 32 according to the optical output power for each output light wavelength that is output from the wavelength variable light source 10. In this case, the "output light wavelength" is the wavelength of the light which is output from the wavelength variable light source 10, the "optical output power" is information about the power of the output light, the "attenuation quantities 1, 2" are the control values of the optical attenuation units 31, 32, respectively, and the like. The voltage value, the electric current value, and the like which are set in the wavelength variable light source 10 can be stored as the "optical output power".

Figure 6:
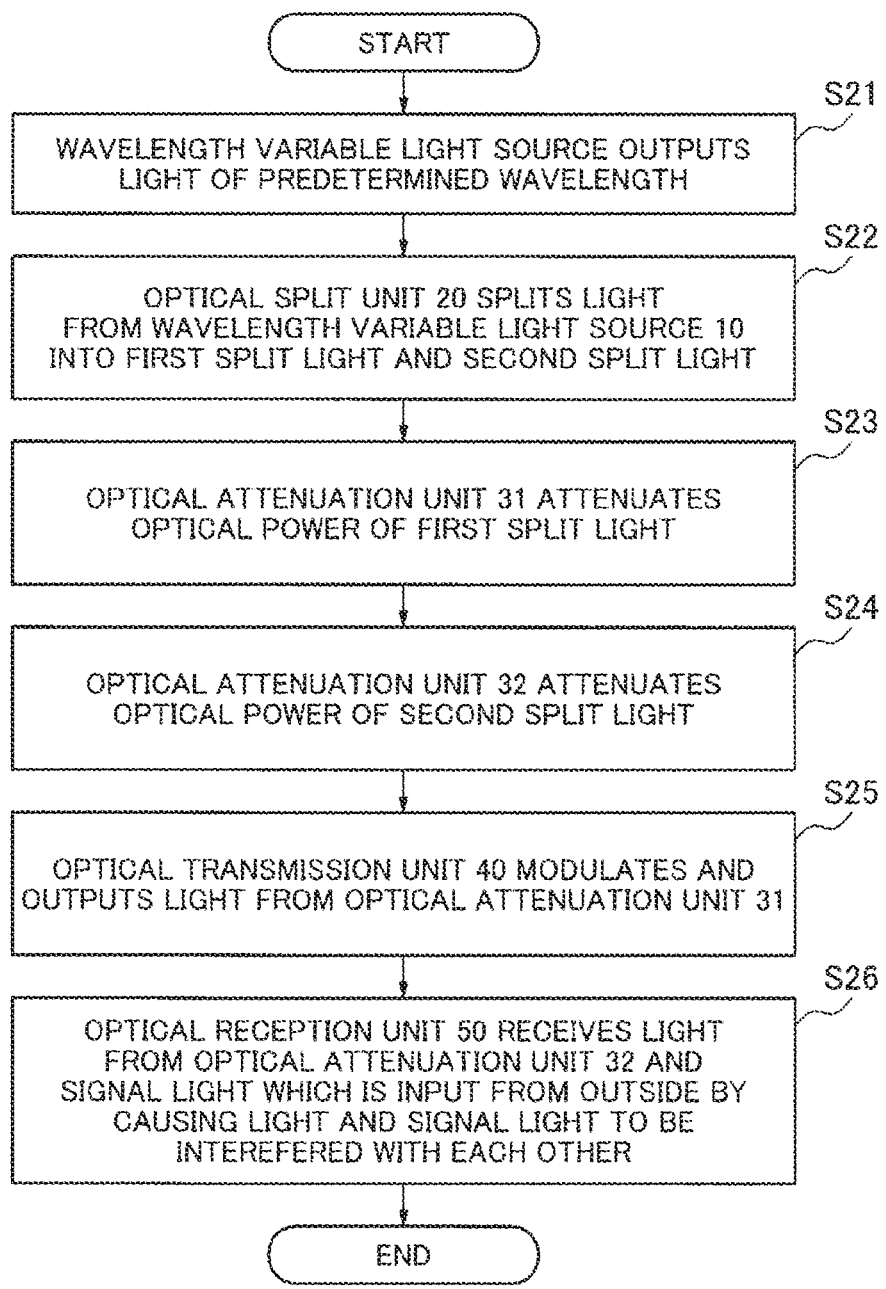
FIG. 6 is a flowchart illustrating operation of an optical transmission/reception device 100a according to the second exemplary embodiment.

Subsequently, operation of the optical transmission/reception device 100a according to the present exemplary embodiment will be explained. FIG. 6 is a flowchart illustrating operation of the optical transmission/reception device 100a according to the present exemplary embodiment. The wavelength variable light source 10 outputs light of a predetermined wavelength in the WDM communication wavelength band (step S21). It is preferable for the control unit 60 to adjust the optical power of the light which is output from the wavelength variable light source 10 so as to cause the transmission property of the optical signal transmitted from the optical transmission/reception device 100a or the reception property of the optical signal received by the optical transmission/reception device 100a to be appropriate.

The optical split unit 20 splits the light, which is input from the wavelength variable light source 10 into the first split light and the second split light (step S22). The optical attenuation unit 31 of the optical power adjustment unit 30 attenuates the optical power of the first split light (step S23). On the other hand, the optical attenuation unit 32 of the optical power adjustment unit 30 attenuates the optical power of the second split light (step S24). In steps S23, S24, the control unit 60 adjusts the attenuation quantities of the optical attenuation units 31, 32 so as to cause the transmission property of the optical signal transmitted from the optical transmission/reception device 100a or the reception property of the optical signal received by the optical transmission/reception device 100a to be appropriate.

The optical transmission unit 40 modulates the light, which is input from the optical attenuation unit 31, and outputs the light to the outside of the optical split insertion device 100a (step S25). The optical reception unit 50 receives the light by causing the light received from the optical attenuation unit 32 and the signal light received from the outside to be interfered with each other (step S26).

The optical transmission/reception device 100a according to the present exemplary embodiment can freely change the wavelength transmitted and received. The optical transmission/reception device 100a adjusts the attenuation quantities of the optical attenuation units 31, 32 so as to cause the optical transmission and reception property in each wavelength to be appropriate.

It should be noted that the present exemplary embodiment is not limited to the optical transmission/reception device 100a having both of the optical attenuation units 31, 32. Alternatively, the optical transmission/reception device 100a may be configured to include any one of the optical attenuation units. In this case, the control unit 60 adjusts the optical output power of the wavelength variable light source 10 so as to cause the property that is not adjusted by the optical attenuation unit (the optical transmission property or the optical reception property) to be appropriate.

More specifically, the control unit 60 controls the wavelength variable light source 10 so as to cause the optical transmission property to be appropriate, and adjusts the attenuation quantity of the optical attenuation unit 32 so as to cause the optical reception property to be appropriate. Alternatively, the control unit 60 controls the wavelength variable light source 10 so as to cause the optical reception property to be appropriate, and adjusts the attenuation quantity of the optical attenuation unit 31 so as to make the optical transmission property to be appropriate.

Further, in a case where an abnormality occurs at the optical transmission-side or the optical reception-side, the optical transmission/reception device 100a according to the present exemplary embodiment can shut down the optical transmission-side or the optical reception-side while maintaining operation at the side in which any abnormality is not detected. For example, the control unit 60 sufficiently increases the optical attenuation quantity of one of the optical attenuation units 31, 32 in which a failure occurs to a level that does not affect other devices and the like, thus practically shutting off the failed one of the optical attenuation units 31, 32.

Third Exemplary Embodiment

Figure 7:
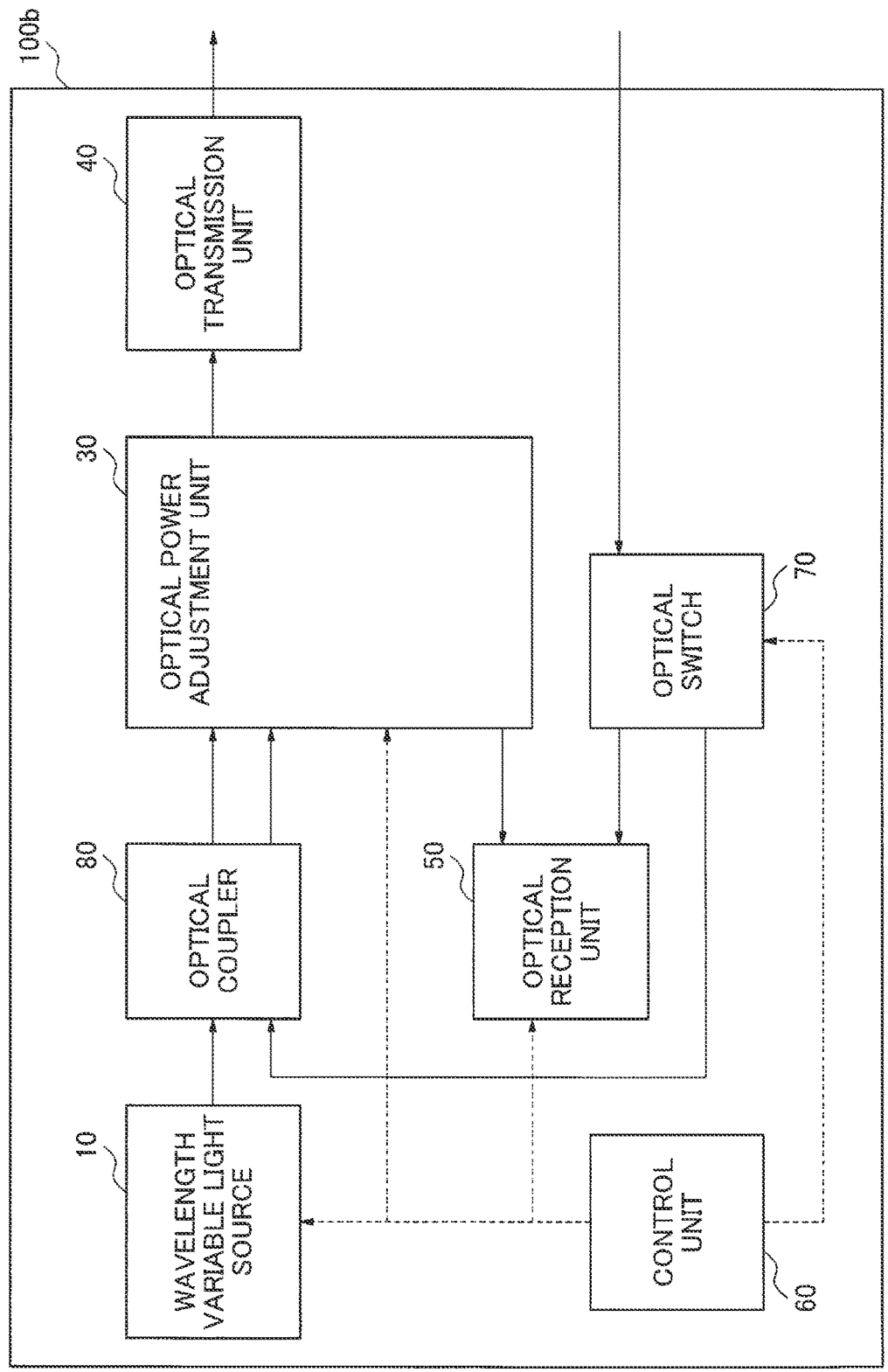
FIG. 7 is a block configuration diagram illustrating an optical transmission/reception device 100b according to a third exemplary embodiment.

The third exemplary embodiment according to the present invention will be explained. FIG. 7 is a block configuration diagram illustrating an optical transmission/reception device 100b according to the present exemplary embodiment. The optical transmission/reception device 100b according to the present exemplary embodiment is configured to adding an optical switch 70 to the optical transmission/reception device 100a (FIG. 3) according to the second exemplary embodiment.

In the present exemplary embodiment, the optical switch 70 outputs the signal light, which is provided from the outside of the optical transmission/reception device 100b, to one of the optical coupler 80 and the optical reception unit 50.

The optical reception unit 50 receives the optical signal which is input by any one of digital coherent detection and direct detection.

The control unit 60 is monitoring the wavelength variable light source 10. Further, the control unit 60 controls the switching of the optical path of the optical switch 70 and the switching of the reception method of the optical reception unit 50.

Figure 8:
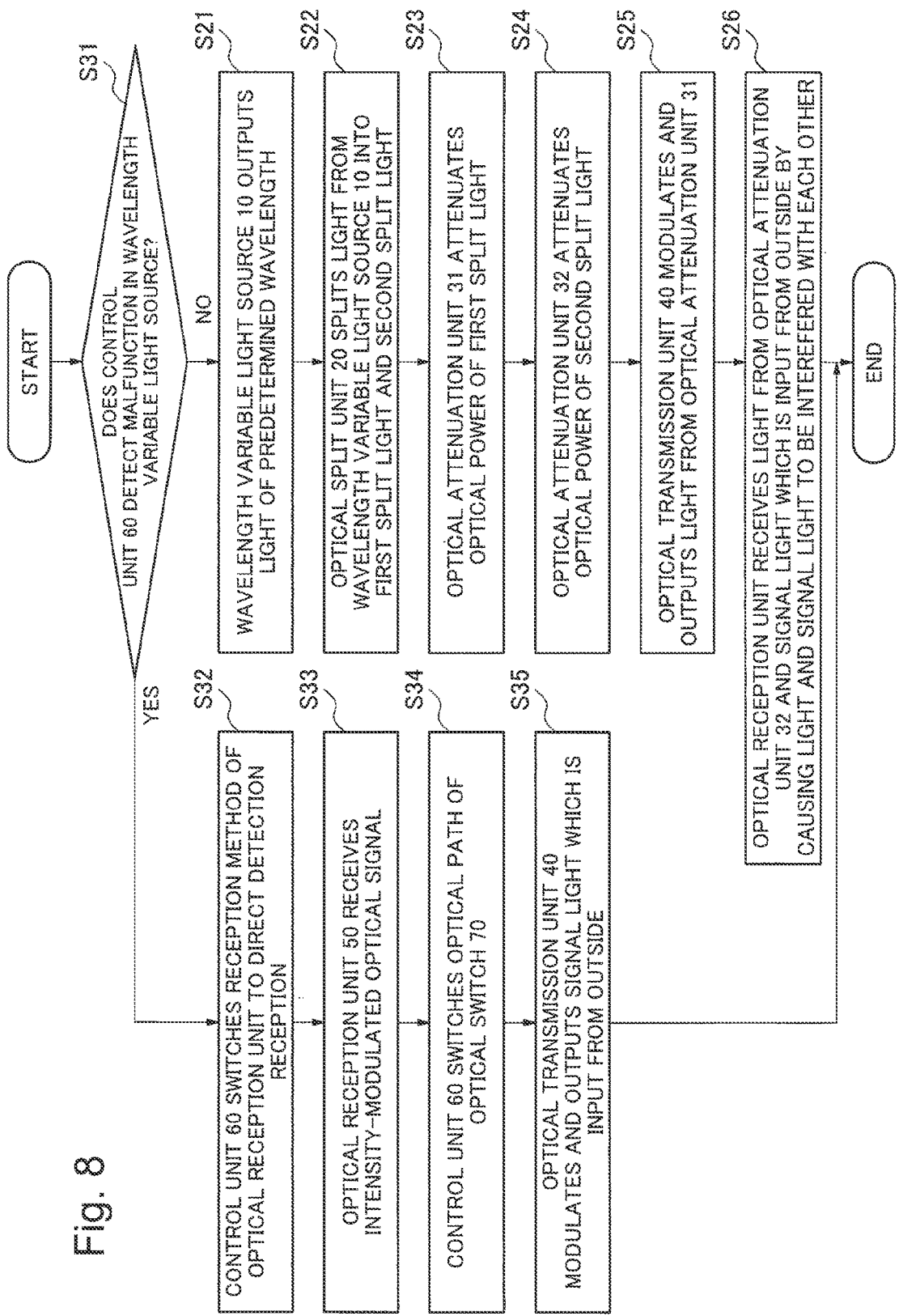
FIG. 8 is a flowchart illustrating operation of the optical transmission/reception device 100b according to the third exemplary embodiment.

Subsequently, operation of the optical transmission/reception device 100b according to the present exemplary embodiment will be explained. FIG. 8 is a flowchart illustrating operation of the optical transmission/reception device 100b according to the present exemplary embodiment. The control unit 60 is monitoring the wavelength variable light source 10 (step S31). In a case where the wavelength variable light source 10 is operating normally (step S31: NO), operation is performed in the same manner as the operation of the exemplary embodiment 2.

On the other hand, in a case where a malfunction is detected in the wavelength variable light source 10 (step S31: YES), the control unit 60 changes the reception method of the optical reception unit 50 from the digital coherent detection to the direct detection (step S32). Therefore, the optical reception unit 50 receives an intensity-modulated optical signal (step S33).

Further, the control unit 60 changes the optical path of the optical switch 70 from the optical reception unit 50 to the optical coupler 80 on the basis of the received intensity-modulated optical signal (step S34). Therefore, the signal light given from the outside of the optical transmission/reception device 100b is input into the optical coupler 80. The optical coupler 80 outputs, instead of the light given from the wavelength variable light source 10, the signal light given from the outside to the optical transmission unit 40 via the optical power adjustment unit 30.

The optical transmission unit 40 intensity-modulates, instead of the light which is input from the wavelength variable light source 10, the signal light given from the outside to the optical transmission/reception device 100b, and outputs the intensity-modulated signal light (step S35). The optical transmission/reception device 100b outputs the intensity-modulated optical signal, thus transmitting a state notification and the like to the other party in communication. The signal light which is input into the optical transmission/ reception device 100b is preferably a continuous light since it is looped back and modulated by the optical transmission unit 40.

According to the present exemplary embodiment, even in a case where the wavelength variable light source 10 malfunctions, the optical reception unit 50 can receive the intensity-modulated optical signal. Further, in a case where the wavelength variable light source 10 malfunctions, the signal light which is input into the optical transmission/ reception device 100b is looped back to the optical transmission unit 40, and therefore, the intensity-modulated optical signal can be transmitted. Therefore, even in a case where the wavelength variable light source 10 malfunctions in the configuration in which the light sources of the optical transmission-side and the optical reception-side are made into a common light source, the optical transmission/reception device 100b according to the present exemplary embodiment can use the optical transmission function and the optical reception function at a time.

Fourth Exemplary Embodiment

The fourth exemplary embodiment according to the present invention will be explained. The optical communication system according to the present exemplary embodiment includes the optical transmission/reception device 100b according to the third exemplary embodiment. FIG. 9 is a system configuration diagram illustrating an optical communication system according to the present exemplary embodiment. In the optical communication system of FIG. 9, the optical transmission/reception device 100b is provided in the terminal-side device 1000, and performs optical transmission and reception with the station-side device 2000.

In the optical communication system according to the present exemplary embodiment, the terminal-side device 1000 operates in the same manner as the optical transmission/reception device 100b explained in the third exemplary embodiment. On the other hand, the station-side device 2000 transmits and receives the coherent optical signal with the terminal-side device 1000. Then, in a case where some kind of failure occurs in the optical transmission/reception device 100b of the terminal-side device 1000, the intensity-modulated optical signal is transmitted and received instead of the coherent optical signal, so that information about abnormality is transmitted and received between the terminal-side device 1000 and the station-side device 2000.

The optical signal transmitted and received when the terminal-side device 1000 is operating normally is shown in FIG. 10A. In FIG. 10A, when the terminal-side device 1000 is operating normally, the terminal-side device 1000 and the station-side device 2000 transmit and receive the digital coherent optical signal.

The optical signal transmitted and received when the wavelength variable light source 10 malfunctions in the terminal-side device 1000 is shown in FIG. 10B. In FIG. 10B, the wavelength variable light source 10 of the terminal-side device 1000 malfunctions, so that the terminal-side device 1000 cannot transmit the digital coherent optical signal, and cannot receive the digital coherent optical signal from the station-side device 2000 ($t_1$). When the wavelength variable light source 10 malfunctions, the terminal-side device 1000 switches the reception method of the optical reception unit 50 from the digital coherent detection to the direct detection as explained in the third exemplary embodiment.

On the other hand, the station-side device 2000 cannot receive the digital coherent optical signal, and therefore, it is recognized that some kind of abnormality occurs in the terminal-side device 1000 ($t_2$). In this case, the station-side device 2000 stops the transmission of the digital coherent optical signal, and transmits a pilot signal of a low bit rate with a predetermined cycle as an intensity-modulated optical signal ($t_3$). Further, the station-side device 2000 drops the reception band of the reception side circuit (frontend), and cuts a high-frequency noise, so that the minimum reception sensitivity is reduced, and the dynamic range between transmission and reception is expanded.

The terminal-side device 1000 switches the reception method to the direct detection, so that the terminal-side device 1000 can receive the pilot signal which is output from the station-side device 2000 ($t_3$). In a case where the terminal-side device 1000 receives the pilot signal which is output from the station-side device 2000, the terminal-side device 1000 uses the received pilot signal to synchronize with the station-side device 2000.

Then, after the station-side device 2000 transmits the pilot signal with the predetermined period, the station-side device 2000 finishes the transmission of the pilot signal, and starts transmission of a continuous light such as ALL-High signal ($t_4$). In this case, the station-side device 2000 transmits, to the terminal-side device 1000, a continuous light intensity-modulated with a low-speed communication by reducing the bit rate, in order to ensure tolerance against the property degradation due to the loop back of light.

The terminal-side device 1000 switches the optical path of the optical switch 70 from the optical reception unit 50 to the optical coupler 80 ($t_4$) in accordance with a point in time at which the intensity-modulated optical signal which is output from the station-side device 2000 is switched from the pilot signal to the continuous light. Accordingly, the continuous light which is input from the station-side device 2000 is guided to the optical coupler 80.

After the optical power of the continuous light which is input into the optical coupler 80 is adjusted by the optical power adjustment unit 30, the continuous light is intensity-modulated by the optical transmission unit 40, and is transmitted to the station-side device 2000 as the intensity-modulated optical signal.

According to the present exemplary embodiment, the optical transmission/reception device 100b which is advantageous in realizing a lower power consumption and reduction of the size is used, and therefore, the system can be established and operated easily at a low cost. Optical communication can be done between the terminal-side device 1000 and the station-side device 2000 even when the wavelength variable light source 10 malfunctions, and communication such as a state notification can be performed. It should be noted that the optical communication system according to the present exemplary embodiment can be applied to an ROADM (Reconfigurable Optical Add/Drop Multiplexer) communication system and the like.

Each of the exemplary embodiments described above is an example showing the present invention, and in the present invention, various configurations other than what is shown in the exemplary embodiments may be achieved. Some or all of the above exemplary embodiments may be described as shown in the following Supplementary notes, but are not limited thereto.

(Supplementary Note 1)

An optical transmission/reception device including an optical output unit, an optical split unit for splitting the light from the optical output unit into a first split light and a second split light, an optical power adjustment unit for adjusting a ratio of the optical power of the first split light and the optical power of the second split light, an optical transmission unit for modulating the first split light, and outputs the modulated first split light as a first optical signal, and an optical reception unit for receiving the second split light and a second optical signal given from an outside by causing the second split light and the second optical signal to be interfered with each other.

(Supplementary Note 2)

The optical transmission/reception device according to Supplementary note 1, wherein the optical output unit is a wavelength variable light source, and the optical transmission/reception device further includes a control unit for controlling the optical power adjustment means in accordance with a wavelength of an output light which is output from the wavelength variable light source.

(Supplementary Note 3)

The optical transmission/reception device according to Supplementary note 1 or 2, wherein the optical power adjustment unit includes one or both of a first optical attenuation unit for attenuating the optical power of the first split light and a second optical attenuation unit for attenuating the optical power of the second split light, and the control unit controls the attenuation quantity of the first or the second optical attenuation unit in accordance with the optical output power of the wavelength variable light source.

(Supplementary Note 4)

The optical transmission/reception device according to any one of Supplementary notes 1 to 3, further including an optical switch for switching and outputting a second optical signal to any one of the optical reception unit and the split unit, wherein the optical reception unit receives an intensity-modulated signal, the split unit outputs the second optical signal to the optical transmission unit, and the optical transmission unit intensity-modulates and outputs the second optical signal.

(Supplementary Note 5)

The optical transmission/reception device according to Supplementary note 4, wherein the control unit monitors and detects malfunction of the optical output unit, and in a case where the control unit detects malfunction in the optical output unit, the control unit switches the reception method of the optical reception unit to a direct detection.

(Supplementary Note 6)

An optical communication system including a terminal-side device including the optical transmission/reception device according to any one of Supplementary notes 1 to 5, and a station-side device for transmitting and receiving an optical signal to and from the terminal-side device.

(Supplementary Note 7)

An optical transmission/reception method including outputting light, splitting the output light into a first split light and a second split light, adjusting a ratio of the optical power of the first split light and the optical power of the second split light, modulating the first split light obtained by adjusting the optical power, and outputting the modulated first split light as a first optical signal, and receiving the second split light and a second optical signal given from an outside by causing the second split light and the second optical signal to be interfered with each other.

(Supplementary Note 8)

The optical transmission/reception method according to Supplementary note 7, wherein the attenuation quantity of the first or the second optical attenuation unit is controlled in accordance with the optical output power of the output light.

(Supplementary Note 9)

The optical transmission/reception method according to Supplementary note 7 or 8, including monitoring the output light, changing a method for receiving the second optical signal to a direct detection in a case where a malfunction is detected, and modulating and outputting at least a part of the second optical signal.

(Supplementary Note 10)

A program used for an optical transmission/reception device including monitoring a malfunction, switching a method for receiving a signal light which is input from an outside from a coherent detection to a direct detection in a case where a malfunction is detected, and modulating and outputting at least a part of the signal light which is input from the outside.

The invention of the present application is not limited to the above exemplary embodiment, and even when there is, e.g., a change of design without deviating from the gist of this invention, such change of design is included in this invention. The invention of the present application claims a priority right based on Japanese Patent Application No. 2013-053440 filed on Mar. 15, 2013, and all the disclosure thereof is incorporated herein by reference.

INDUSTRIAL APPLICABILITY

The invention of the present application can be not only applied to an optical transmission/reception device treating a digital coherent optical signal, but also widely applied to a communication network including an optical transmission/reception device transmitting and receiving various kinds of optical signals.

REFERENCE SIGNS LIST 1 optical output unit
2 optical split unit
3 optical power adjustment unit
4 optical transmission unit
5 optical reception unit
10 wavelength variable light source
20 optical split unit
30 optical power adjustment unit
40 optical transmission unit
50 optical reception unit
60 control unit
31, 32 optical attenuation unit
70 optical switch
80 optical coupler
100, 100a, 100b transmission/reception device
1000 terminal-side device
2000 station-side device

The invention claimed is:

1. An optical module comprising:
a light source configured to output a light;
a splitter configured to split the light into a transmission light and a local oscillation light;
a variable optical attenuator downstream of the splitter, the variable optical attenuator being configured to receive the transmission light;
a modulator configured to modulate the transmission light;
a coherent receiver configured to receive an optical input signal by interference with the local oscillation light; and
a controller configured to control attenuation of the variable optical attenuator.

2. The optical module according to claim 1,
wherein the light source is a variable wavelength light source, and the controller is configured to control a wavelength of the variable wavelength light source.

3. The optical module according to claim 1,
wherein the controller is configured to control optical power of the light in accordance with an optical property of the optical input signal.

4. The optical module according to claim 1,
wherein the controller is configured to control attenuation of the variable optical attenuator in accordance with an optical property of the light.

5. The optical module according to claim 1,
wherein the controller is configured to control attenuation of the variable optical attenuator in accordance with an optical property of the optical input signal.

6. The optical module according to claim 1, further comprising:
a second variable optical attenuator downstream of the splitter, the second variable optical attenuator being configured to receive the local oscillation light and attenuate the local oscillation light,
wherein the controller is configured to control attenuation of the second variable optical attenuator.

7. An optical communication system comprising:
a first optical communication apparatus; and
a second optical communication apparatus which is configured to communicate with the first optical communication apparatus;
wherein the first optical communication apparatus comprises:
a light source configured to output a light;
a splitter configured to split the light into a transmission light and a local oscillation light;
a variable optical attenuator downstream of the splitter and configured to receive the transmission light;
a modulator configured to modulate the transmission light;
a coherent receiver configured to receive an optical input signal by interference with the local oscillation light; and
a controller configured to control attenuation of the variable optical attenuator.

8. The optical communication system according to claim 7,
wherein the light source is a variable wavelength light source, the controller is configured to control a wavelength of the variable wavelength light source.

9. The optical communication system according to claim 7,
wherein the controller is configured to control optical power of the light in accordance with an optical property of the optical input signal.

10. The optical communication system according to claim 7,
wherein the controller is configured to control attenuation of the variable optical attenuator in accordance with an optical property of the light.

11. The optical communication system according to claim 7,
wherein the controller is configured to control attenuation of the variable optical attenuator in accordance with an optical property of the optical input signal.

12. The optical communication system according to claim 7, further comprising:
a second variable optical attenuator downstream of the splitter, the second variable optical attenuator being configured to receive the local oscillation light and attenuate the local oscillation light,
wherein the controller is configured to control attenuation of the second variable optical attenuator.

13. An optical communication method comprising:
outputting a light;
splitting the light into a transmission light and a local oscillation light, the transmission light being input to a variable optical attenuator;
modulating the transmission light;
receiving an optical input signal by interference with the local oscillation light; and controlling the variable optical attenuator to attenuate the variable optical attenuator.

14. The optical communication method according to claim 13, further comprising controlling a wavelength of the light.

15. The optical communication method according to claim 13, further comprising controlling optical power of the light in accordance with an optical property of the optical input signal.

16. The optical communication method according to claim 13, further comprising controlling attenuation of the variable optical attenuator in accordance with an optical property of the light.

17. The optical communication method according to claim 13, further comprising controlling attenuation of the variable optical attenuator in accordance with an optical property of the optical input signal.

18. The optical communication method according to claim 17, further comprising controlling attenuation of a second variable optical attenuator which attenuates the local oscillation light.

19. The optical module according to claim 2, wherein the controller is further configured to control optical power of the light in accordance with a wavelength of the light.

20. The optical communication system according to claim 8, wherein the controller is further configured to control optical power of the light in accordance with a wavelength of the light.

21. The optical communication method according to claim 14, further comprising controlling optical power of the light in accordance with a wavelength of the light.

* * * * *